(12) United States Patent
Lindell et al.

(10) Patent No.: US 9,302,337 B2
(45) Date of Patent: Apr. 5, 2016

(54) HEAT EXCHANGER TUBE, HEAT EXCHANGER TUBE ASSEMBLY, AND METHODS OF MAKING THE SAME

(75) Inventors: Eric Lindell, Waterford, WI (US); Girish Mantri, Franklin, WI (US); Gregory Hughes, Milwaukee, WI (US); Paul Topitzes, Greenfield, WI (US)

(73) Assignee: Modine Manufacturing Company, Racine, WI (US)

( * ) Notice: Subject to any disclaimer, the term of this patent is extended or adjusted under 35 U.S.C. 154(b) by 212 days.

(21) Appl. No.: 13/570,795

(22) Filed: Aug. 9, 2012

(65) Prior Publication Data
US 2014/0041227 A1    Feb. 13, 2014

(51) Int. Cl.
| | |
|---|---|
| *B21D 53/02* | (2006.01) |
| *B23K 1/008* | (2006.01) |
| *B23P 15/26* | (2006.01) |
| *B23K 31/02* | (2006.01) |
| *F28F 21/08* | (2006.01) |
| *F28F 1/10* | (2006.01) |
(Continued)

(52) U.S. Cl.
CPC .............. *B23K 1/008* (2013.01); *B21D 53/085* (2013.01); *B23K 1/0012* (2013.01); *B23K 31/02* (2013.01); *B23P 15/26* (2013.01); *F28D 1/05366* (2013.01); *F28F 1/025* (2013.01); *F28F 1/04* (2013.01); *F28F 1/10* (2013.01); *F28F 1/126* (2013.01); *F28F 1/20* (2013.01); *F28F 21/08* (2013.01); *F28D 2021/0094* (2013.01); *F28F 2275/045* (2013.01); *F28F 2280/02* (2013.01); *Y10T 29/4935* (2015.01); *Y10T 29/49378* (2015.01)

(58) Field of Classification Search
CPC ... B23K 1/0012; B32B 2457/08; B23P 15/26; Y10T 29/4935; Y10T 29/49353; Y10T 29/49378; F28F 1/12
USPC ......... 29/890.03, 890.053, 890.052, 890.043, 29/890.054, 890.046, 890.047, 890.045, 29/890.032, 890.039
See application file for complete search history.

(56) References Cited

U.S. PATENT DOCUMENTS

| | | |
|---|---|---|
| 1,992,795 A | 2/1935 | Young |
| 2,181,927 A | 12/1939 | Townsend |
(Continued)

FOREIGN PATENT DOCUMENTS

| | | |
|---|---|---|
| CN | 201611235 | 10/2010 |
| EP | 1479994 | 11/2004 |
(Continued)

OTHER PUBLICATIONS

Office Action from the Korean Intellectual Property Office for Application No. 10-2012-0133286 dated Aug. 27, 2014 (5 pages).
(Continued)

*Primary Examiner* — David Bryant
*Assistant Examiner* — Lee A Holly
(74) *Attorney, Agent, or Firm* — Michael Best & Friedrich LLP

(57) ABSTRACT

A tube assembly for use in a heat exchanger is made by arranging a first corrugated fin structure between one broad, flat side of a tube and a side sheet, and arranging a second corrugated fin between another broad and flat side of a tube and another side sheet. Compressive forces are applied to the opposite faces of the side sheets to place crests and troughs of the corrugated fin structures into contact with the side sheets and the broad, flat sides, and the assembly is brazed.

20 Claims, 9 Drawing Sheets

(51) Int. Cl.
*F28F 1/20* (2006.01)
*B23K 1/00* (2006.01)
*B21D 53/08* (2006.01)
*F28D 1/053* (2006.01)
*F28F 1/02* (2006.01)
*F28F 1/04* (2006.01)
*F28F 1/12* (2006.01)
*F28D 21/00* (2006.01)

(56) References Cited

U.S. PATENT DOCUMENTS

| | | | |
|---|---|---|---|
| 2,262,158 A | 11/1941 | Beam | |
| 2,883,165 A | 4/1959 | Jensen et al. | |
| 3,391,732 A | 7/1968 | Murray et al. | |
| 3,422,518 A | 1/1969 | French | |
| 3,857,151 A | 12/1974 | Young | |
| 4,053,969 A * | 10/1977 | Bayard | 29/890.039 |
| 4,159,034 A | 6/1979 | Bellovary et al. | |
| 4,216,824 A | 8/1980 | Braun et al. | |
| 4,236,577 A | 12/1980 | Neudeck | |
| 4,546,824 A | 10/1985 | Melnyk | |
| 4,570,704 A | 2/1986 | Braun et al. | |
| 4,580,324 A | 4/1986 | Laska | |
| 4,589,481 A | 5/1986 | Mansson | |
| 4,606,495 A * | 8/1986 | Stewart et al. | 228/183 |
| 4,655,282 A | 4/1987 | Roffelsen | |
| 4,749,627 A | 6/1988 | Ishikawa et al. | |
| 4,911,351 A | 3/1990 | Ishikawa et al. | |
| 5,099,576 A | 3/1992 | Shinmura | |
| 5,105,877 A | 4/1992 | Ando | |
| 5,236,045 A | 8/1993 | Janezich et al. | |
| 5,251,693 A | 10/1993 | Zifferer | |
| 5,318,113 A | 6/1994 | Potier | |
| 5,348,082 A | 9/1994 | Velluet et al. | |
| 5,433,268 A | 7/1995 | Janezich et al. | |
| 5,579,832 A | 12/1996 | Le Gauyer | |
| 5,704,423 A * | 1/1998 | Letrange | 165/177 |
| 5,881,456 A | 3/1999 | Bergins et al. | |
| 6,357,513 B1 | 3/2002 | Janezich et al. | |
| 7,213,807 B2 * | 5/2007 | Blanchard et al. | 270/58.32 |
| 8,251,134 B2 | 8/2012 | Janezich | |
| 2002/0086179 A1* | 7/2002 | Wittebrood | 428/652 |
| 2003/0131981 A1 | 7/2003 | Kohler et al. | |
| 2005/0092444 A1 | 5/2005 | Kohlgruber | |
| 2005/0211424 A1* | 9/2005 | Podhorsky et al. | 165/152 |
| 2007/0116957 A1* | 5/2007 | Pan et al. | 428/408 |
| 2010/0043230 A1 | 2/2010 | Bhatti | |
| 2012/0227933 A1 | 9/2012 | Chen et al. | |
| 2014/0182829 A1 | 7/2014 | Ouradnik et al. | |
| 2014/0345137 A1 | 11/2014 | Chen et al. | |

FOREIGN PATENT DOCUMENTS

| | | |
|---|---|---|
| FR | 1378716 | 11/1964 |
| GB | 1232414 | 5/1971 |
| JP | 11221639 | 8/1999 |
| JP | 2009024967 | 2/2009 |
| KR | 1020030072582 | 9/2003 |
| WO | 2009086825 | 7/2009 |

OTHER PUBLICATIONS

Office Action from the Korean Intellectual Property Office for Application No. 10-2012-0133286 dated Feb. 23, 2015 (7 pages).

\* cited by examiner

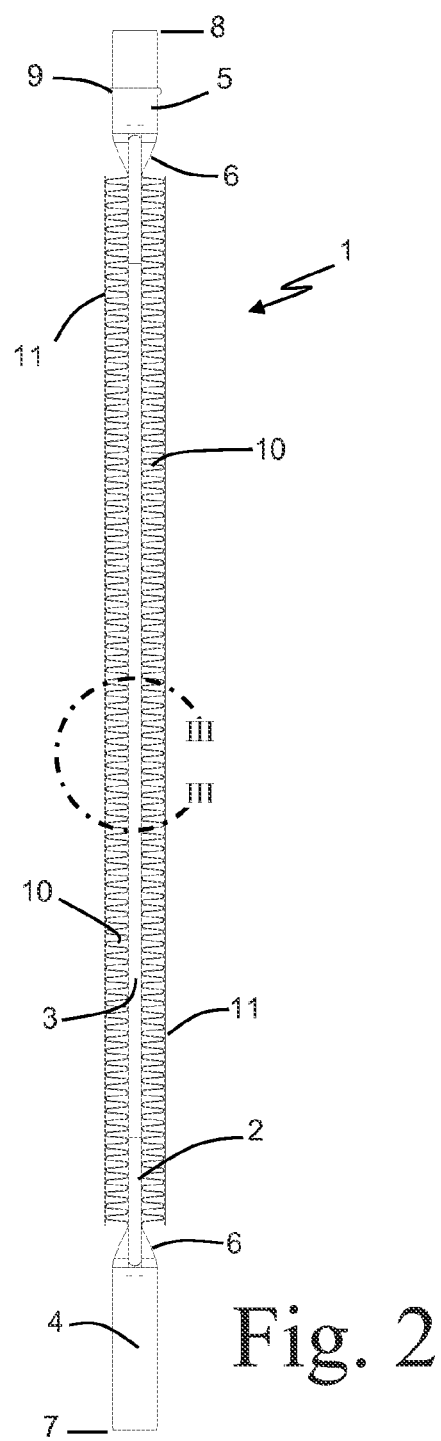
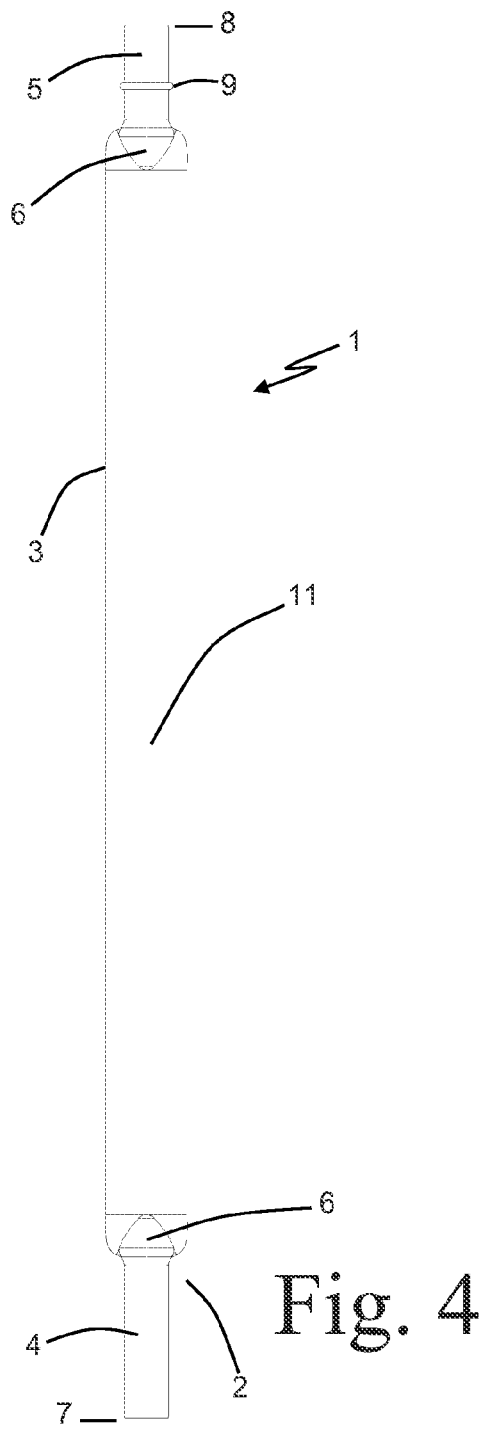
Fig. 2
Fig. 4

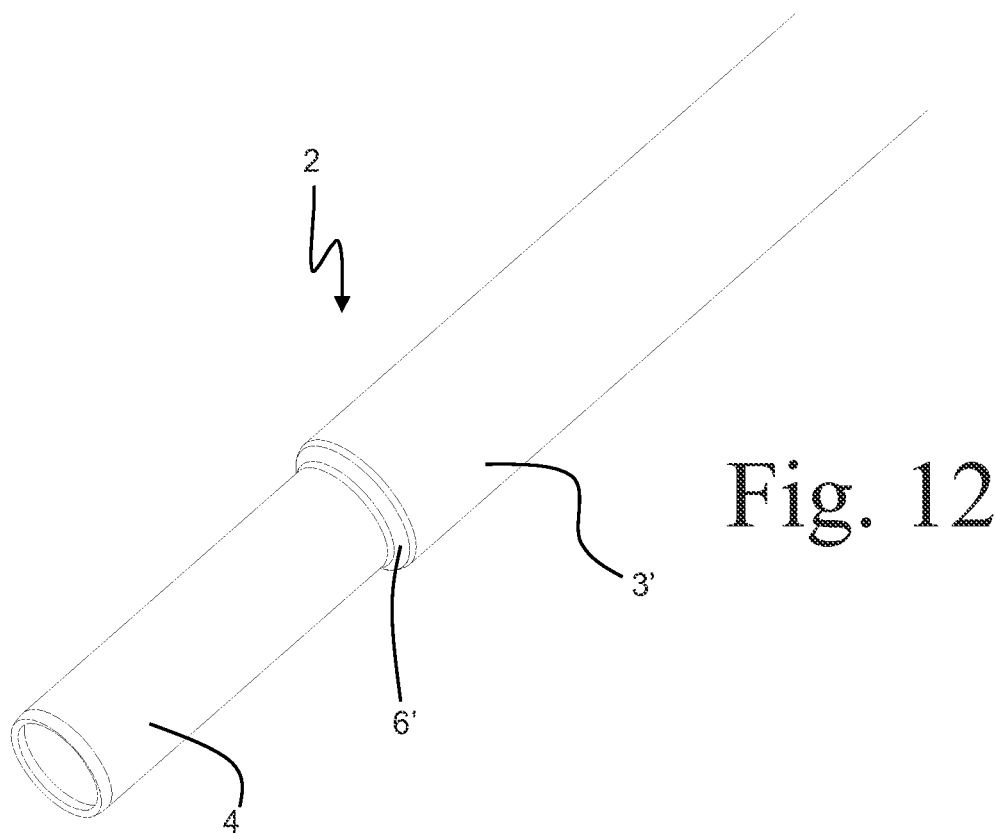
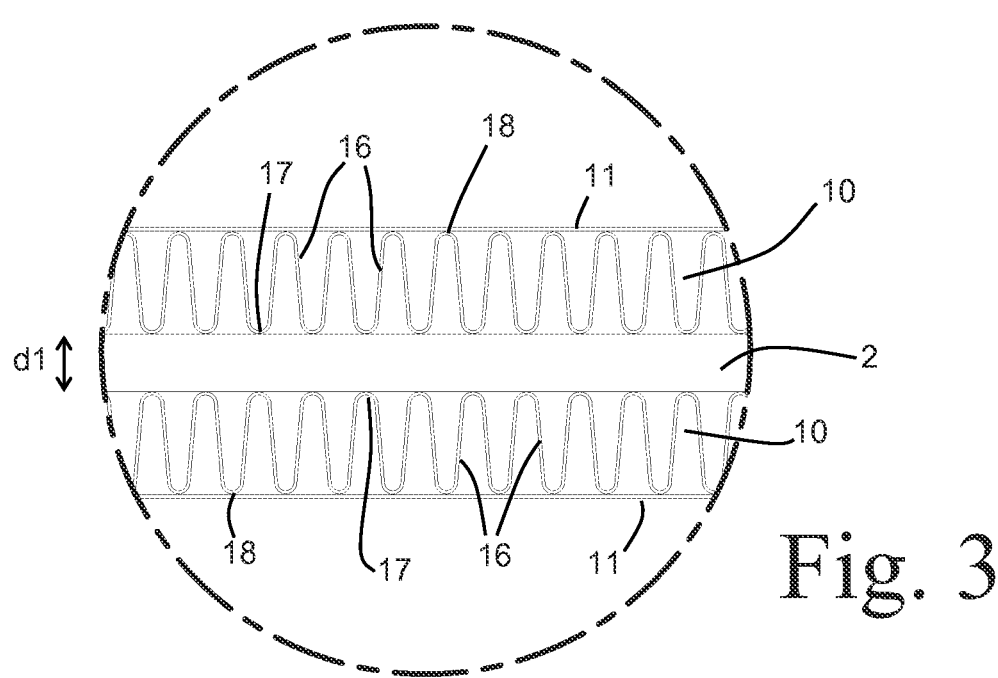

HEAT EXCHANGER TUBE, HEAT EXCHANGER TUBE ASSEMBLY, AND METHODS OF MAKING THE SAME

FIELD OF THE INVENTION

The present invention generally relates to tubes, and to fin and tube assemblies for heat exchangers, and to methods for making the same.

BACKGROUND

Large scale heat exchangers incorporating discrete, individually replaceable tube assemblies having a tube to convey a first fluid, and secondary heat transfer surface area for a second fluid transferring heat to or from the first fluid, are well known. As an example, heat exchangers of this type functioning as heavy duty equipment radiators to transfer waste heat from engine coolant to air have been described in U.S. Pat. No. 3,391,732 to Murray, and U.S. Pat. No. 4,236,577 to Neudeck. The tube assemblies used in these heat exchangers have a central finned section for heat exchange, and un-finned cylindrical end sections for insertion into sealing grommets.

Heat exchanger tube assemblies of the kind described above are typically constructed of copper, with the extended air-side surfaces in the finned region being soldered to the tube. Copper provides the advantages of high thermal conductivity, easy manufacturability, and good strength and durability. However, the steadily increasing price of copper has led to a demand for alternate, lower cost materials.

Aluminum has replaced copper as the preferred material of construction in other heat exchangers (automobile and commercial radiators, for example), but has not successfully replaced copper in heavy duty heat exchangers of this kind Aluminum has substantially lower strength than copper, leading to durability concerns. This is especially problematic in applications where individual tube assemblies need to be removed and inserted in the field, as damage is likely to occur during such handling. Furthermore, the bonding of aluminum components requires substantially higher temperatures than the soldering of copper, leading to manufacturing difficulties. Thus, there is still room for improvement

SUMMARY

According to an embodiment of the invention, a tube assembly for a heat exchanger includes a tube having a flat section with spaced apart broad tube sides joined by opposing narrow tube sides. The tube assembly further includes two fin structures, each having wave crests and troughs connected by flanks, and two generally planar side sheets. Wave troughs of one fin structure are joined to one of the broad tube sides, and wave crests of that fin structure are joined to a face of one of the side sheets. Wave troughs of the other fin structure are joined to the other broad tube side, and wave crests of that fin structure are joined to a face of the other side sheet.

In some embodiments the tube includes cylindrical sections at the lengthwise ends of the tube, with the flat section arranged between the cylindrical sections. In some embodiments the tube, the fin structures, and the side sheets are joined by braze joints, and in some embodiments they are formed of one or more aluminum alloys. According to some embodiments the thickness of the broad tube sides is at least twice the thickness of the side sheets.

According to another embodiment of the invention, a tube assembly for a heat exchanger includes a fluid flow conduit extending in a lengthwise direction over at least a portion of the tube assembly. The fluid flow conduit has a major dimension and minor dimension, both perpendicular to the lengthwise direction, the minor dimension being substantially smaller than the major dimension. A continuous tube wall surrounds the flow conduit. Two generally planar side sheets are spaced equidistantly from the continuous tube wall in the minor dimension direction, and are connected to the tube wall by thin webs.

In some such embodiments the continuous tube wall defines a tube wall centroidal moment of inertia with respect to an axis in the major dimension direction. In some embodiments the centroidal moment of inertia of the tube assembly with respect to that axis is at least five times the tube wall centroidal moment of inertia, and in some embodiments at least ten times.

In some embodiments a first cylindrical tube section is joined to the continuous tube wall at a first end of the flow conduit, and a second cylindrical tube section is joined to the continuous tube wall at a second end of the flow conduit. In some such embodiments the outer perimeter defined by the continuous tube wall is greater than the outer perimeter of at least one of the cylindrical tube sections.

According to another embodiment of the invention, a method of making a heat exchanger tube assembly includes providing a tube, first and second corrugated fin structures, and first and second generally planar side sheets. The first corrugated fin structure is arranged between the first side sheet and a first broad and flat side of the tube, and the second corrugated fin structure is arranged between the second side sheet and a second broad and flat side of the tube. A compressive force is applied to opposing sides of the side sheets to place crests and troughs of the fin structures into contact with the side sheets and the broad and flat sides, and braze joints are created between the first fin structure and the first side sheet, the first fin structure and the first broad and flat side, the second fin structure and the second side sheet, and the second fin structure and the second broad and flat side.

In some such embodiments, the tube, fin structures, and side sheets are elevated in temperature in a vacuum environment to create the braze joints. In other environments they are elevated in temperature in a controlled inert gas environment. In some embodiments providing the tube, fin structures, and side sheets includes providing a material coated with a braze filler metal.

In some embodiments the compressive force is transmitted through a first separator sheet adjacent to the first side sheet, and through a second separator sheet adjacent to the second side sheet. In some such embodiments the separator sheets have a coefficient of thermal expansion that is generally matched to that of the tube, side sheets, and fin structures. In some embodiments the first separator sheet is one of several separator sheets adjacent to the first side sheet.

According to another embodiment of the invention, a method of making heat exchanger tube assemblies includes providing several tubes, several corrugated fin structures, and several generally planar side sheets. Each of the tubes is arranged between pairs of the corrugated fin structures, and each of the corrugated fin structures is arranged between one of the tubes and one of the side sheets. The tubes, corrugated fin structures, and side sheets are arranged into a stack. Separator sheets are arranged between adjacent pairs of the side sheets, and adjacent to the side sheets at the outermost ends of the stack. A compressive load is applied to the stack in the stacking direction. Braze joints are created at the points of contact between the corrugated fin structures and the tubes, and between the corrugated fin structures and the side sheets, and the brazed tube assemblies are removed from the separator sheets.

In some such embodiments, the tubes, fin structures, and side sheets are elevated in temperature in a vacuum environment to create the braze joints. In other environments they are elevated in temperature in a controlled inert gas environment. In some embodiments providing the tubes, fin structures, and side sheets includes providing a material coated with a braze filler metal.

According to another embodiment of the invention, a tube for a heat exchanger includes a first cylindrical section extending from a first end of the tube, a second cylindrical section extending from a second end of the tube, and a flat section located between the ends and having two broad and flat, spaced apart parallel sides joined by two relatively short sides. Transition regions are located between each of the cylindrical sections and the flat section. The intersections of the transition regions and each of the broad and flat sides of the tube define curvilinear paths.

In some such embodiments the two relatively short sides are arcuate in profile. In some embodiments each of the curvilinear paths includes an apex located at a center plane of the tube, and in some such embodiments an arcuate path segment is located at the apex.

In some embodiments the transition region adjacent to one of the cylindrical sections extends over a length that is at least equal to the diameter of that section. In some embodiments the outer perimeter of the flat section of the tube is greater than the outer perimeter of at least one of the cylindrical sections, and in some embodiments is at least twenty-five percent greater.

In some embodiments the flat tube section defines a tube major dimension between outermost points of the two relatively short sides, and the curvilinear paths are each longer than the tube major dimension. In some embodiments the tube is made from an aluminum alloy.

According to another embodiment of the invention, a heat exchanger tube is formed from a round tube by reducing a diameter of the round tube in a first section of the round tube, and flattening a second section adjacent to the first section to define two spaced apart, broad and flat sides in the second section. In some embodiments the first sections terminates at an end of the tube. In some embodiments the second section is flattened after reducing the diameter of the first section.

In some embodiments the diameter of the first section is reduced by a swaging operation. In some embodiments the second section is flattened by impacting that section in a stamping die. In some embodiments the tube is made from an aluminum alloy.

In some embodiments a mandrel is inserted into the tube prior to flattening the second section, and is removed from the tube after flattening the second section.

In some embodiments, the diameter of a third section of the round tube is reduced, the third section being adjacent to the second section. In some such embodiments the third section terminates at a second end of the tube. In some embodiments the second section is flattened after reducing the diameter of the third section.

BRIEF DESCRIPTION OF THE DRAWINGS

FIG. 2 is an elevation view of the heat exchanger tube assembly of FIG. 1.

FIG. 3 is a detail view of the portion of FIG. 2 bounded by the line III-III.

FIG. 4 is a plan view of the heat exchanger tube assembly of FIG. 1.

FIG. 12 is a partial perspective view of the partially formed tube of FIG. 8.

DETAILED DESCRIPTION

Figure 1:
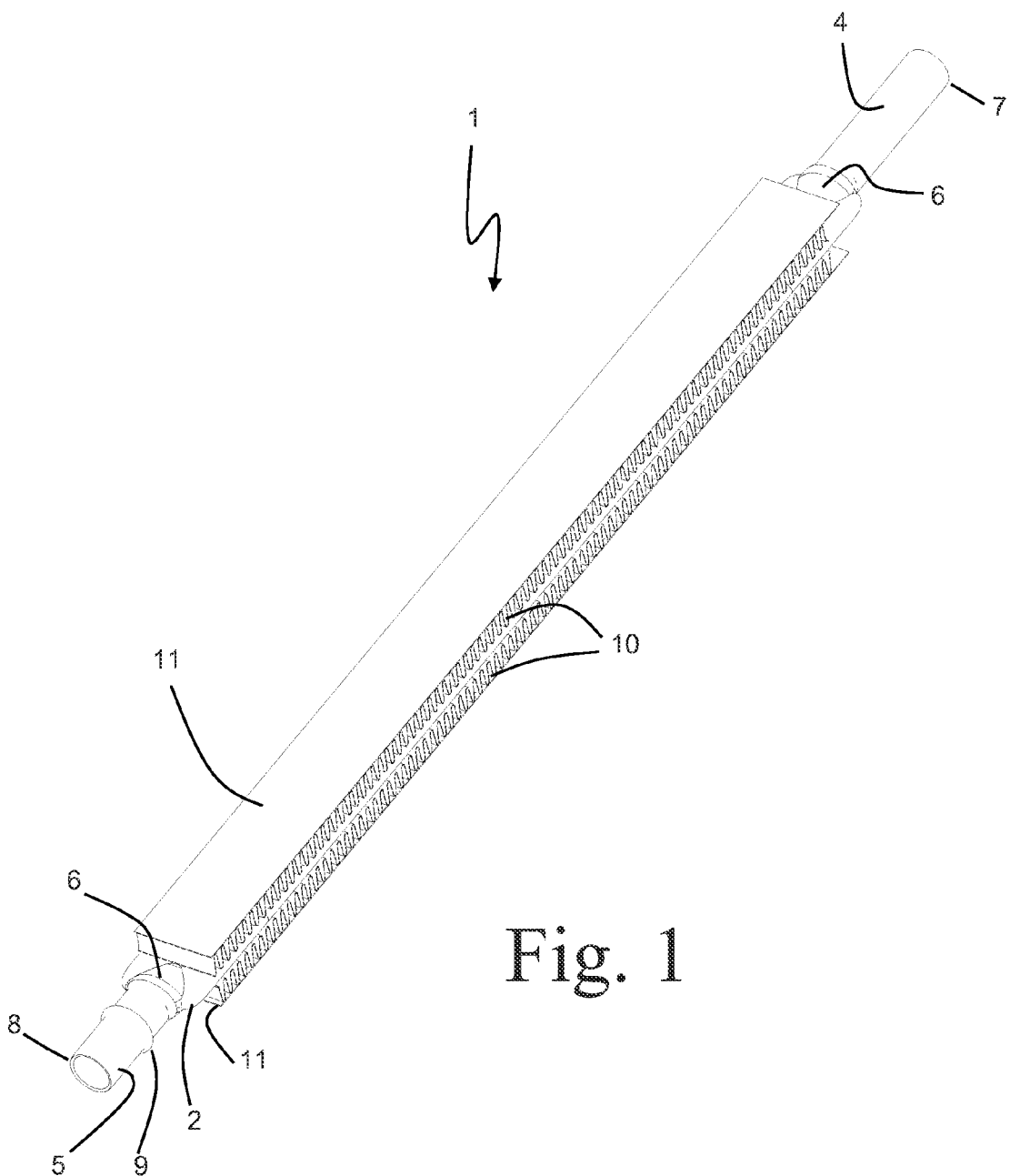
FIG. 1 is a perspective view of a heat exchanger tube assembly according to an embodiment of the invention.
Figure 5:
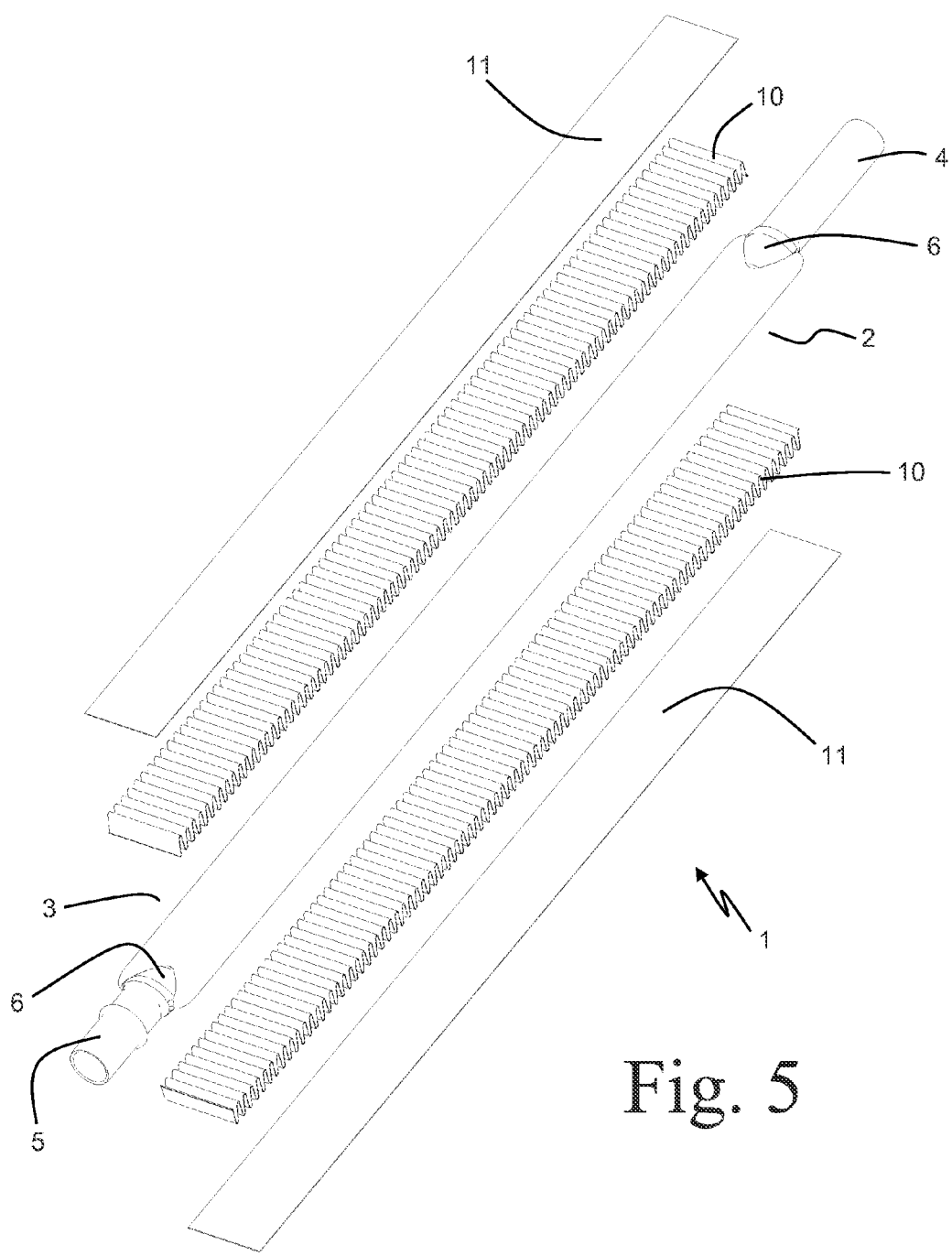
FIG. 5 is an exploded perspective view of the heat exchanger tube assembly of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A heat exchanger tube assembly 1 according to an embodiment of the invention is shown in FIGS. 1-5. Such a tube assembly 1 can be used as one of many individual tubes of a heat exchanger, for example a radiator, in large heavy duty equipment such as an excavator, mining truck, gen-set, etc. It should be understood, however, that the tube assembly 1 can be used in heat exchangers of various types and sizes.

The tube assembly 1 includes a tube 2 extending from a first end 7 to a second end 8. The tube 2 defines a fluid flow conduit whereby a fluid (by way of example, engine coolant) can be transported through the tube assembly 1. As one example, the tube assembly 1 can be used in an engine coolant radiator in order to reject waste heat from a flow of engine coolant as that flow of engine coolant flow through the tube 2 from one of the ends 7, 8 to the other of the ends 7, 8.

The tube 2 includes a flat section 3 located between the ends 7, 8. The flat portion 3 (best described with reference to FIG. 11) includes first and second parallel, broad and flat sides 12. The broad and flat sides 12 are spaced apart from one another, and are joined by two opposing, spaced apart, narrow tube sides 15. While the narrow tube sides 15 are shown as being arcuate in profile in the exemplary embodiment, in other embodiments the narrow tube sides 15 can be straight, or they can be of some other profile shape. The two broad and flat sides 12 and the two narrow sides 15 together define a continuous tube wall 25 of the fluid flow conduit, with an open spaces defined interior to the continuous tube wall 25 in order to allow for the flow of a fluid through the tube 2. While none are shown in the exemplary embodiment, it can be preferable in some cases to provide surface enhancement or flow turbulation features within the flow conduit in order to enhance the rate of heat transfer between a fluid passing through the tube 2 and the tube wall 25.

Figure 11:
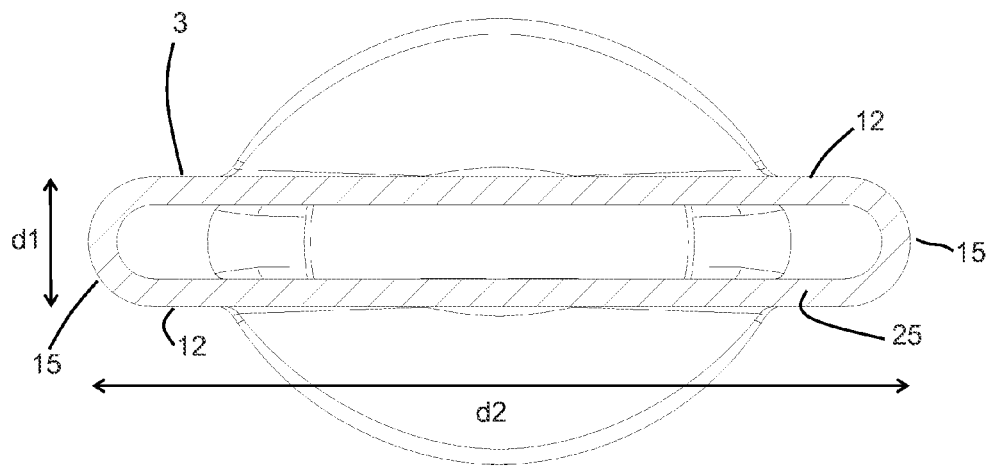
FIG. 11 is a section view along the lines XI-XI of FIG. 8.

Continuing with reference to FIG. 11, the flat section 3 of the tube 2 has a tube minor dimension, d1, defined as the distance between the outward-facing surfaces of the two broad and flat sides 12, and a tube major dimension, d2, defined as the distance between outermost points of the two narrow sides 15. In some highly preferable embodiments the major dimension, d2, is several times greater than the minor dimension, d1. As an example, the major dimension of the exemplary embodiment is nine times greater than the minor dimension.

The tube assembly 1 further includes two convoluted fin structures 10 arranged along the flat section 3. The fin structures 10 include multiple flanks 16 connected in alternating fashion by crests 18 and troughs 17 so that each of the fin structures 10 is of an approximately sinusoidal shape (best seen in FIG. 3). The fin structures 10 can be of a plain type, as shown in FIG. 3, or they can include additional features to increase heat transfer, structural strength, durability, or combinations of the above. By way of example, in some embodiments the fin structures 10 can include louvers, bumps, slits, lances, or other features that are known to improve heat transfer and/or structural rigidity of the flanks 16. In other embodiments, an edge hem can be provided at one or both of the ends of a fin structure 10 adjacent the narrow tube sides 15. Such an edge hem can be especially beneficial in providing resistance to damage that may be caused by impingement of rocks or other debris.

Thin side sheets 11 are also included in the tube assembly 1. These side sheets 11 are parallel to the opposing broad and flat sides 12 of the tube 2, and are spaced equidistantly therefrom on either side by the fin structures 10. Accordingly, the flanks 16, crests 18, and troughs 17 of the fin structures 11 provide a plurality of thin webs to space the side sheets 11 from the continuous tube wall 25. The side sheets 11 are generally planar, but can include features such as, for example, bent edges in order to provide increased stiffness and/or to aid in assembly.

The spaces between the flanks 16 provide flow channels for a fluid to be placed in heat transfer relation with the fluid passing through the tube 2, so that heat can be exchanged between the two fluids. As an example, ambient air can be directed through the flow channels in order to cool engine jacket coolant passing through the tube 2. It should be understood, however, that various other fluids can be placed in heat transfer relation using the tube assembly 1. Each of the flow channels between the flanks 16 is further defined by one of the troughs 17 and crests 18, and by one of the flat sides 12 of the tube 2 and the generally planar side sheets 11. By fully bounding the flow channels in this manner, the fluid passing through those channels is prevented from prematurely exiting the channels, thus improving the ability to transfer heat.

The tube 2, fin structures 10, and side sheets 11 are preferably bonded together to form a monolithic structure in order to provide both good thermal contact between the fluids to be placed in heat transfer relation, and good structural integrity. While a variety of materials can be used to construct the tube assembly 1, in highly preferable embodiments the tube 2, fin structures 10, and side sheets 11 are formed from metals having a high thermal conductivity, such as aluminum, copper, and the like. The components can be bonded together to form the tube assembly 1 by a variety of processes including brazing, soldering, gluing, etc.

In order to promote good heat transfer between the fluids, it can be advantageous for the fin structures 10 and the side sheets 11 to extend over the full major dimension d2 of the flat section 3. In some cases, it may be preferable to extend the fin structures 10 and the side sheets 11 slightly beyond the outer edges of the arrow tube sides 15 in order to protect the fluid flow conduit from damage by impingement of rocks or other debris.

The inclusion of even very thin side sheets 11 has been found to greatly stiffen the tube assembly 1, especially with respect to bending about the centroidal axis in the tube major dimension d2. The fin structures 10 provide very little stiffness in this direction due to their convoluted nature, so that, in the absence of the side sheets 11, the continuous tube wall 25 provides the only resistance to bending about that centroidal axis. Due to the relatively small minor dimension d1 of the flat tube section 3, the resistance to bending about that centroidal axis by the continuous tube wall 25 alone is fairly small, and the spacing of the side sheets 11 away from that centroidal axis by a distance substantially greater than the minor dimension d1 provides substantial benefit.

The impact of the side sheets 11 on the bending stiffness of the tube assembly 1 about the centroidal axis in the tube major dimension d2 can be quantified by comparing the centroidal moment of inertia about that axis of the tube assembly 1 to that of the tube 2 alone (the fin structures 10 can be assumed to provide no contribution to the centroidal moment of inertia, other than by maintaining the offset of the side sheets 11 from the flat sides 12 of the tube 2). For an exemplary embodiment having a tube wall thickness of 0.8 mm, a side sheet thickness of 0.25 mm, a fin structure height of 6.55 mm, a minor dimension of 3.7 mm, and a major dimension of 23.27 mm, the centroidal moment of inertia about the tube major dimension axis for the tube assembly and the tube alone are calculated to be 925 mm$^4$ and 76 mm$^4$, respectively. In other words, the centroidal moment of inertia of the tube assembly about the tube major dimension axis is approximately twelve times that of the tube itself. In preferable embodiments the centroidal moment of inertia of the tube assembly about the tube major dimension axis is at least five times that of the tube itself, and in highly preferable embodiments, at least ten times. This is especially preferable when the tube 2 is constructed of a material exhibiting relatively low modulus of elasticity, for example, alloys of aluminum.

The tube 2 of the exemplary embodiment further includes a first cylindrical section 4 adjacent to the first end 7, and a second cylindrical section 5 adjacent to the second end 8, with the flat section 3 arranged between the first and second cylindrical sections. These cylindrical sections 4, 5 allow for reliable and leak-free insertion of the tube assembly 1 into receiving grommets arranged in opposing headers of a heat exchanger (not shown). In order to maximize the amount of the tube available for effective heat transfer, the length of the cylindrical end sections are preferably kept to a minimum, and the length of the flat section 3 is preferably 90% or more of the overall length of the tube 2. A circumferential bead 9 is provided in the cylindrical section 5 of the exemplary embodiment in order to limit the downward movement of the tube assembly 1 when vertically arranged in a heat exchanger.

While the embodiments shown in the accompanying figures include the cylindrical end sections at both ends of the tube, it should be understood that in some instances a tube assembly 1 can be devoid of one or both cylindrical end sections 4, 5. When such cylindrical end sections are not included, the corresponding receiving grommets can be provided with receiving openings that correspond to the profile of the continuous tube wall 25 in the flat section 3.

In certain preferable embodiments of the invention, a heat exchanger tube assembly 1 is made by creating braze joints between an aluminum tube 2, first and second aluminum corrugated fin structures 10, and first and second aluminum side sheets 11. The first corrugated fin structure 10 is arranged between the first side sheet 11 and a first broad and flat side 12 of the tube 2, while the second corrugated fin structure 10 is arranged between the second side sheet 11 and a second broad and flat side 12 of the tube 2. The assembly is compressed in order to place crests 18 and troughs 17 of the fin structures 10 in contact with the adjacent parts so that braze joints can be formed at the points of contact.

A brazing filler metal having a melting temperature that is lower than the melting temperatures of the tube 2, fin structures 10, and side sheets 11 is used to create the braze joints. Such a filler metal is typically aluminum with small quantities of other elements (silicon, copper, magnesium, and zinc, for example) added to reduce the melting temperature. The braze filler metal can advantageously be provided as a coating on one of more of the components to be brazed. In some embodiments, both sides of the sheet material used to form the corrugated fin structures 10 is coated with the braze filler metal, thereby providing the required braze filler metal at all of the contact points where braze joints are desired while avoiding having braze filler metal at locations where joints are not necessary or undesirable.

While many methods can be used to elevate the temperature of the tube 2, the fin structures 10, and the side sheets 11 in order to melt the braze filler metal and form the braze joints, two especially preferable methods are vacuum brazing and controlled atmosphere brazing. In vacuum brazing, the assembled parts are placed into a sealed furnace and substantially all of the air is removed in order to create a vacuum environment. In this process, magnesium present in the alloys is released as the parts are heated and serves to break up the oxide layer present on the external surfaces of the components, allowing the molten braze filler metal to bond to the exposed aluminum. The oxide layer is prevented from reforming and interfering with the metallurgical bonding by the absence of oxygen in the vacuum environment.

In controlled atmosphere brazing, flux is applied to the components prior to heating. Heating of the parts occurs in an inert gas environment in order to prevent the re-formation of the oxide layer after the flux reacts and displaces the oxide layer present on the mating surfaces of the parts. With the oxide layer displaced, the molten braze filler metal bonds to the exposed aluminum in order to create the braze joints.

Figure 6:
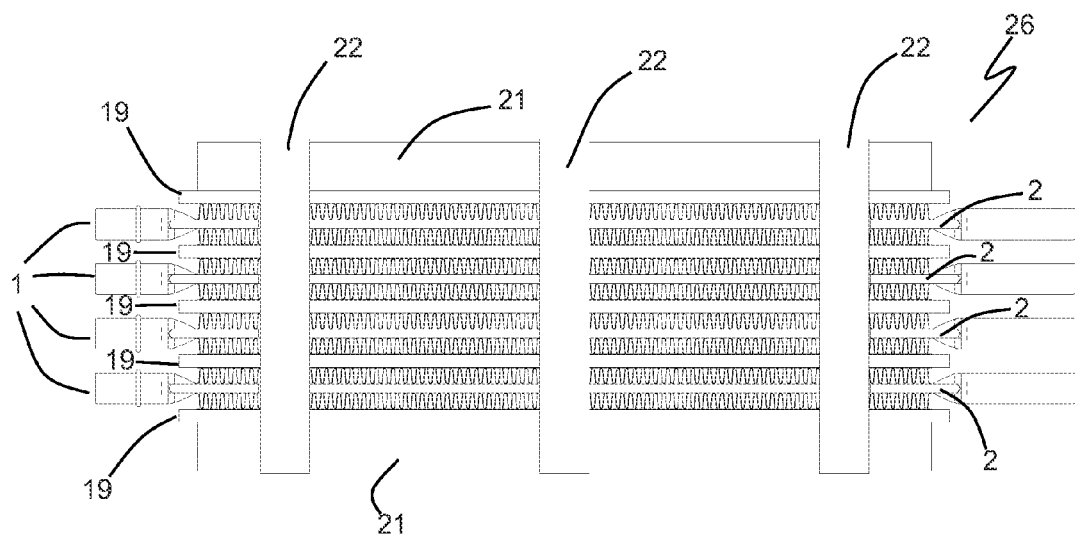
FIG. 6 is an elevation view of a stack of heat exchanger tube assemblies being made according to an embodiment of the invention.

It can be especially preferable to braze several of the tube assemblies 1 at one time in order to increase throughput in a production manufacturing environment. FIG. 6 illustrates a method according to an embodiment of the invention wherein four tube assemblies 1 are made simultaneously. It should be understood that the same method can be used to make more than four or fewer than four of the tube assemblies at a time.

In the embodiment of FIG. 6, tubes 2, corrugated fin structures 10, and generally planar side sheets 11 are provided. Each of the tubes 2 is arranged between pairs of the corrugated fin structures 10, and each of the corrugated fin structures 10 is arranged between one of the tubes 2 and one of the generally planar side sheets 11. Separator sheets 19 are arranged between adjacent pairs of the generally planar side sheets 11. The tubes 2, corrugated fin structures 10, and generally planar side sheets 11 are arranged into a stack 26. Additional separator sheets 19 are arranged adjacent to the generally planar side sheets 11 at the outermost ends of the stack 26, and a compressive load is applied to the stack 26 in the stacking direction in order to place the crests 18 and the troughs 17 of the convoluted fin structures into contact with the adjacent side sheets 11 and broad and flat sides 12 of the tubes 2.

In order to provide a uniform compressive load to the stack 26, bars 21 having a high stiffness (for example, structural steel channels) can be used on the outermost ends of the stack 26. The compressive load can be maintained after it has been applied to the stack through the use of metal bands 22 that surround the stack 26 in several locations. The bands 22 are tightened over the bars 21 while the stack 26 is compressed, so that tension in the bands 22 maintains the compressive load. After having been so assembled, the stack 26 is placed into a brazing furnace in order to create the individual tube assemblies 1. The stack 26 is heated within the furnace to a temperature suitable for melting the braze filler metal, after which the stack 26 is cooled in order to re-solidify the melted braze filler metal, thereby creating braze joints at the contact points. After cooling, the individual tube assemblies 1, having been brazed into individual monolithic structures, can be removed from the separator sheets 19. The separator sheets 19 can be provided with a coating to prevent any metallurgical bonding between the separator sheets 19 and the side sheets 11, as such undesirable bonding can otherwise occur at brazing temperature even without the presence of braze filler metal.

As the stack 26 is heated to a brazing temperature, thermal expansion of the metal materials in the stack 26 will occur. In aluminum brazing, the components are typically heated to a brazing temperature of 550° C. to 650° C. This temperature range is substantially higher than that used to solder copper components, and consequently the thermal expansion experienced by the components of the tube assemblies 1 during the bonding process is substantially greater if the components are aluminum than if they are copper.

The inventors have found that care must be taken during the brazing process to ensure that the fin structures 10 are not distorted by the heating to brazing temperature and cooling back down to ambient temperature. Unlike in traditional brazed aluminum radiator manufacturing, involving multiple rows of tubes and fin structures joined together into a monolithic brazed core, the flanks 16 of the fin structures 10 are prone to distortion by shearing forces introduced through thermal expansion differences between the components of the tube assemblies 1 and the separator sheets 19. In some embodiments of the invention, this problem is remedied by generally matching the thermal expansion coefficient of the separator sheets 19 match that of the tubes 2, fin structures 10, and side sheets 11. This can be achieved by forming the separator sheets 19 from similar aluminum alloys, or from another material exhibiting a similar rate of thermal expansion.

Figure 7:
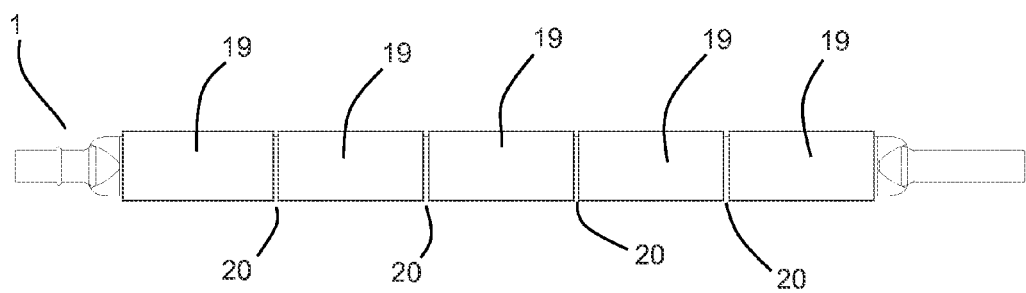
FIG. 7 is a plan view of certain components of the stack of FIG. 6.

Alternatively, or in addition, multiple individual separator sheets 19 can be used between each adjacent tube assembly 1, as shown in FIG. 7. Gaps 20 are provided between adjacent ones of the individual separator sheets 19. In the case where the separator sheets 19 are constructed of a material having a substantially different coefficient of thermal expansion than the materials from which the tubes 2, fin structures 10, and side sheets 11 are constructed, the gaps 20 can increase or decrease during the heating and cooling of the stack 26, thereby substantially alleviating the distortion of the fin structures 10 that might otherwise result from the mismatch in thermal expansion coefficients. The gaps 20 serve as breaks to avoid the accumulation of the thermal expansion induced distortion, so that any such distortion is limited to the discrete contact areas underneath each of the individual separator sheets 19. The assembly method depicted in FIG. 7 can be especially beneficial when a more temperature resistant material such as stainless steel is used for the separator sheets 19, and the components of the tube assemblies 1 are made from aluminum.

The tube 2 will now be discussed in greater detail, with specific reference to FIGS. 8-13. As described previously, the embodiment of the tube 2 shown in FIG. 8 includes a flat tube section 3 located between a first cylindrical tube section 4 and a second cylindrical tube section 5. The first cylindrical tube section 4 extends from the first end 7 of the tube 2, while the second cylindrical tube section 5 extends from the second end 8 of the tube 2. Transition regions 6 are located between the flat section 3 and each of the cylindrical sections 4 and 5. The transition regions 6 provide a smooth continuous flow path for a fluid passing through the tube 2, as well as avoiding locations of mechanical stress concentration in the tube material.

Figure 8:
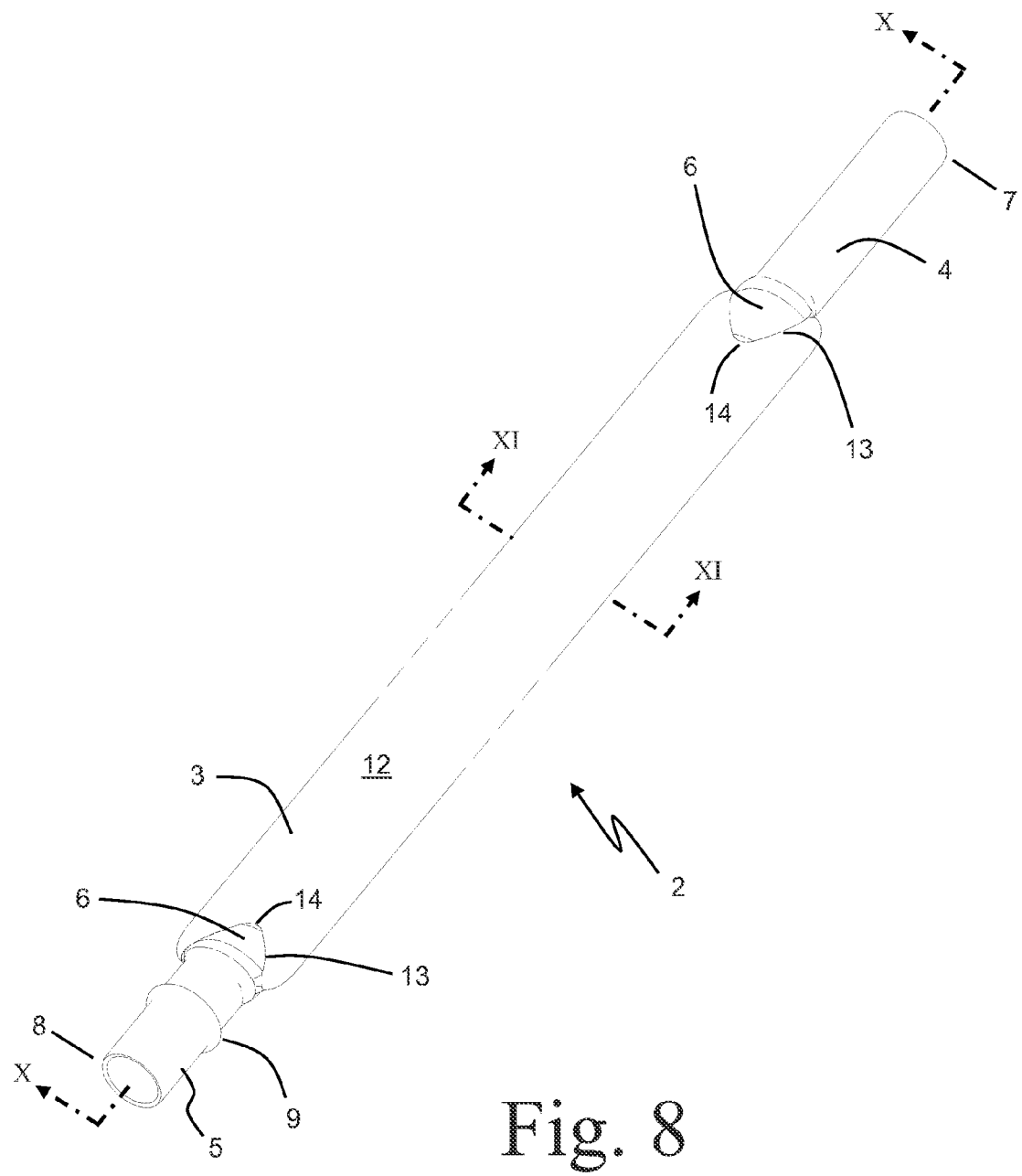
FIG. 8 is a perspective view of a heat exchanger tube according to an embodiment of the invention.
Figure 10:
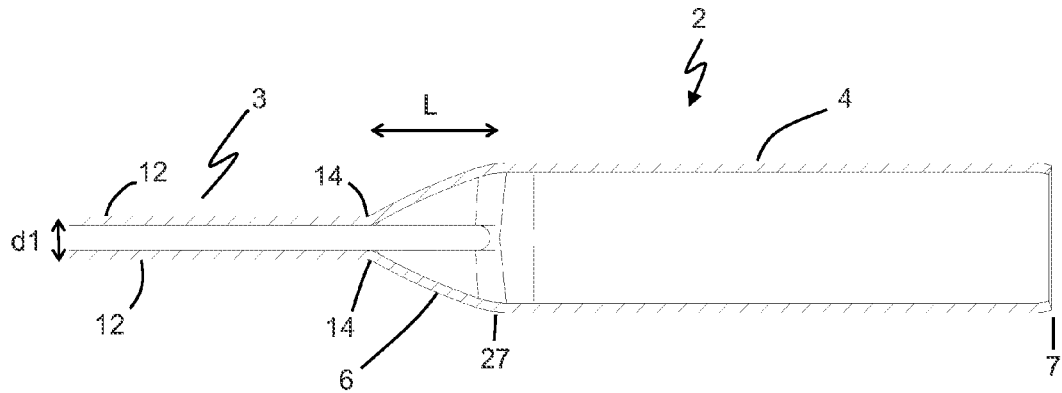
FIG. 10 is a partial section view along the lines X-X of FIG. 8.

As shown in detail in the partial sectional view of FIG. 10, a transition region 6 extends over a length L, spanning from a location 27 proximal to the end 7 of the tube 2 to a location 14 distal to the end 7. The length L is preferably at least equal to the diameter of the cylindrical end section 4, although in some alternative embodiments it may be smaller in size than the diameter of the corresponding end section. As seen in FIG. 8, the broad and flat side 12 extends past the locations 14 at either end so that at least a portion of the broad and flat side 12 is located along the tube 2 between the locations 27 and 14 that define the beginning and end of a transition region 6.

Figure 9:
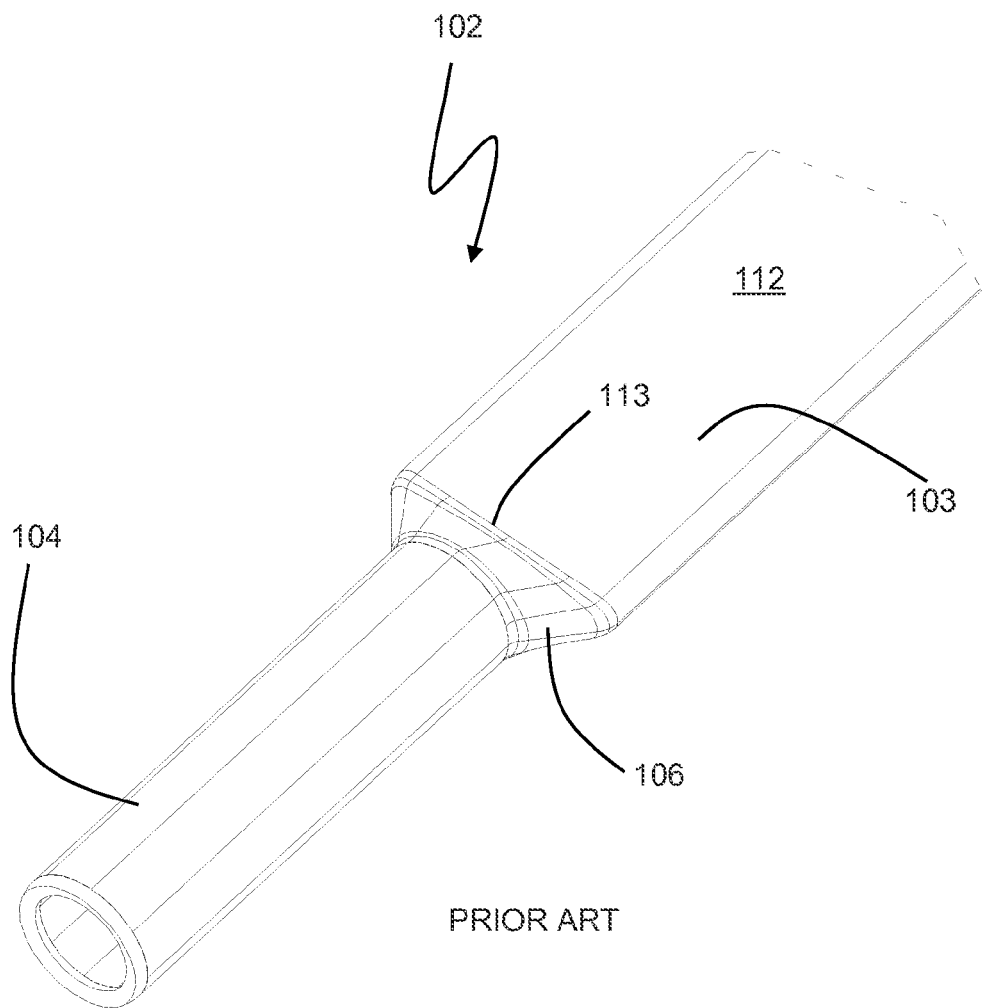
FIG. 9 is a partial perspective view of a prior art heat exchanger tube.

In preferable embodiments, the intersections of the transition regions 6 and the broad and flat sides 12 of the flat tube region 3 define curvilinear paths 13. These curvilinear paths 13 provide a beneficial stiffening of the flat section 3 of the tube 2 with respect to a bending moment about the tube major dimension axis. For purposes of comparison, a prior art tube 102 is shown in FIG. 9 and includes a flat section 103 joined to a cylindrical section 104 by way of a transition section 106. The intersection of the transition region 106 and the flat section 103 defines a straight path 113 on the broad and flat side 112 of the flat section 103. The straight path 113 extends in the tube major dimension, and bending about the major dimension axis is fairly easy. This can be especially detrimental during the installation and/or removal of a tube assembly containing the tube 102 from a heat exchanger, as such installation and such removal frequently applies bending moments of this type onto the tube. This problem is especially exacerbated when the tube is constructed of a fairly low strength material such as annealed aluminum.

The inventors have found that the curvilinear path 13 provides a substantial stiffening effect to resist a bending moment of the aforementioned type, and prevents buckling or other damage to the tube 2 during installation, removal, and other handling of the tube 2 or a tube assembly 1 containing a tube 2. While benefit can be derived from any non-linear path, it can be especially beneficial for the path 13 to be defined by a series of connected arcuate path segments.

In the exemplary embodiment, the curvilinear paths 13 each include an apex located at the approximate center plane of the tube, so that the apex is located at the point 14 along the path 13 that is furthermost away from the end 7 (in the case of the transition region between the flat section 3 and the first cylindrical end 4) or the end 8 (in the case of the transition region between the flat section 3 and the second cylindrical end 5). The path 13 preferably includes an arcuate path segment at the apex so that stress concentrations are avoided at the apex.

In some preferable embodiments, the outer perimeter (i.e. circumference) of at least one of the two cylindrical sections 4, 5 is less than the outer perimeter of the continuous tube wall 25 in the flat section 3. This advantageously allows for a relatively large heat transfer surface area per unit length in the flat section 3, without requiring a correspondingly large diameter at one or both of the ends 7, 8. A smaller diameter at the ends can be preferable, as it can enable closer spacing of adjacent tube assemblies and requires less sealing surface at the ends, for example. In some preferable embodiments the outer perimeter of the flat section 3 exceeds the outer perimeter of at least one of the two cylindrical end sections by at least 25%.

Heat exchangers including fluid conveying tubes having a flattened profile over the entirety of their length are well-known in the art, having been used for decades as radiators and the like. Flat tubes of this type are usually constructed in one of two ways. They are either extruded and/or drawn in the flat shape from a billet of material and cut into discrete lengths, or they are created in a tube mill from coiled sheet by forming the sheet form into a round shape, seam welding, roll flattening to the flat tube shape, and cutting into discrete tube lengths.

In the case of tubes such as the prior art tube 102 (FIG. 9) having a flattened section 103 and a cylindrical end section 104, the ends of the flat tube are formed into a cylindrical shape to form the cylindrical end section 104, and the transition section 106. This operation can be performed quickly and easily when the tube is constructed from highly malleable material such as copper, and only requires the extreme ends of the tube 2 to be formed. However, this method is not capable of achieving a transition section 6 as previously described.

The transition regions 6 can be formed by initially forming the tube 2 in a round form having an outer diameter equal to the desired outer perimeter of continuous tube wall 25 in the flat section 3. Next, with specific reference to FIG. 12, the ends of the round tube 2 are reduced in diameter to form the cylindrical ends 4 and 5, as well as a tapered transition region 6' between the ends 4, 5 and the central section 3' which retains the original round shape. This reduction in diameter can be accomplished by, for example, swaging of the tube ends. In some preferable embodiments the ends are reduced in diameter by at least 20% in order to achieve the desired ratio of outer perimeters between the flat section 3 and the cylindrical end sections 4, 5.

Figure 13A:
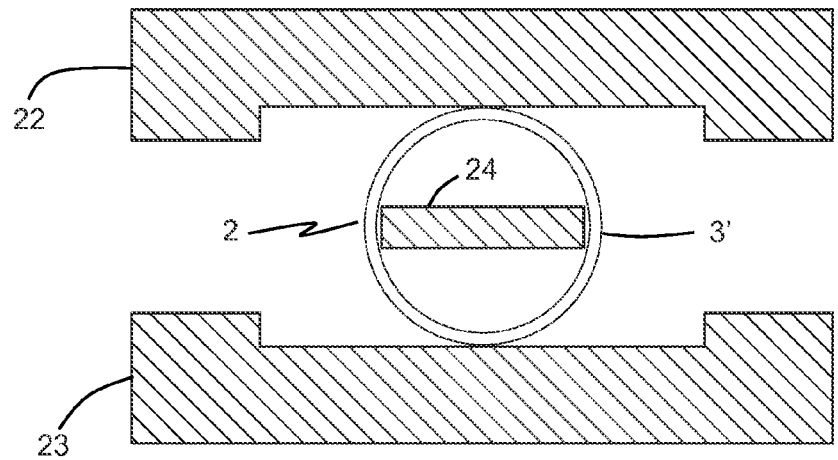
FIGS. 13A and B are diagrammatic views of a forming operation to produce the tube of FIG. 8.
Figure 13B:
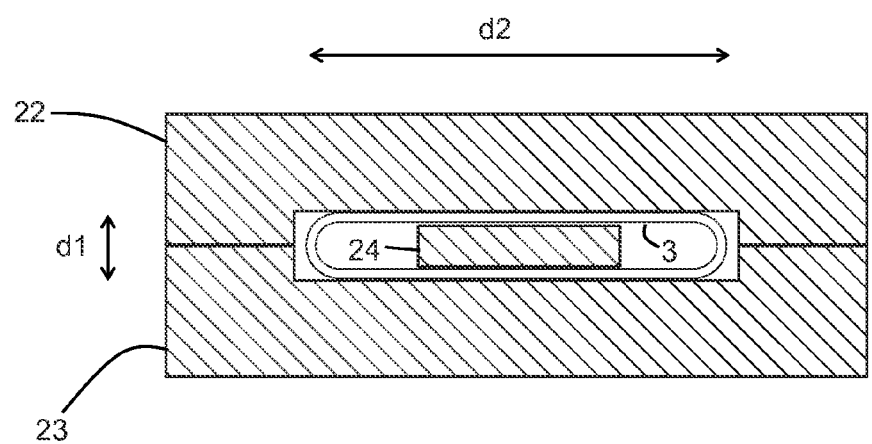

As depicted in FIGS. 13A and 13B, the profile of the flat section 3 of the tube 2 can be defined by forming that portion 3' of the tube 2 between a first forming die half 22 and a second forming die half 23. The tube 2 is inserted between the die halves 22, 23 when the die is in an open position, i.e. when the two die halves are separated from one another, as in FIG. 13A. With the tube 2 so located, the die closes so as to be in the closed position of FIG. 13B, thereby forming the flat section 3 of the tube 2 to the minor dimension d1 and the major dimension d2. Optionally, a mandrel 24 can be placed within the tube 2 prior to the forming operation in order to prevent buckling or other undesirable deformation of the broad and flat tube walls 12 during the forming operation. The mandrel 24, when used, can be removed from the tube 2 after the forming operation is complete. The geometry of the transition regions 6 can be produced by including complementary negative representations of the geometry in the contacting faces of the die halves 22 and 23, so that the desired geometry of the transition regions 6 is formed into the tube 2 during the forming operation.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A method of making a heat exchanger tube assembly, comprising:
   providing a tube having first and second opposing broad and flat sides;
   providing first and second corrugated fin structures;
   providing first and second side sheets;
   arranging the first corrugated fin structure between the first side sheet and the first broad and flat side of the tube;
   arranging the second corrugated fin structure between the second side sheet and the second broad and flat side of the tube;
   applying a compressive force to opposing sides of the first and second side sheets to place crests and troughs of the first corrugated fin structure into contact with the first side sheet and the first broad and flat side of the tube, and to place crests and troughs of the second corrugated fin structure into contact with the second side sheet and the second broad and flat side of the tube; and
   creating braze joints between the first corrugated fin structure and the first side sheet, the first corrugated fin structure and the first broad and flat side of the tube, the second corrugated fin structure and the second side sheet, and the second corrugated fin structure and the second broad and flat side of the tube;
   wherein applying the compressive force includes transmitting the compressive force through a first plurality of separator sheets arranged adjacent the first side sheet, and through a second plurality of separator sheets arranged adjacent the second side sheet, such that the first side sheet is located between the first plurality of separator sheets and the first corrugated fin structure, and the second side sheet is located between the second plurality of separator sheets and the second corrugated fin structure.

2. The method of claim 1, wherein creating braze joints includes elevating the temperature of the tube, the first and second corrugated fin structures, and the first and second side sheets in a vacuum environment.

3. The method of claim 1, wherein creating braze joints includes elevating the temperature of the tube, the first and second corrugated fin structures, and the first and second side sheets in a controlled inert gas atmosphere environment.

4. The method of claim 1, wherein at least one of providing a tube, providing a corrugated fin structure, and providing a side sheet includes providing a material coated with a braze filler metal.

5. The method of claim 1, wherein the first plurality of separator sheets and the second plurality of separator sheets have a coefficient of thermal expansion that is generally matched to the coefficients of thermal expansion of the tube, the first and second corrugated fin structures, and the first and second side sheets.

6. The method of claim 1, wherein the first plurality of separator sheets and the second plurality of separator sheets have a coating to prevent the metallurgical bonding between said separator sheets and the side sheets.

7. A method of making heat exchanger tube assemblies, comprising:
   providing a plurality of tubes having first and second opposing broad and flat sides;
   providing a plurality of corrugated fin structures;
   providing a plurality of side sheets;
   arranging each of the tubes between pairs of the corrugated fin structures;
   arranging each of the corrugated fin structures between one of the tubes and one of the side sheets;
   assembling the tubes, corrugated fin structures, and side sheets into a stack;
   arranging separator sheets between adjacent pairs of the side sheets;
   arranging separator sheets adjacent the side sheets at the outermost ends of the stack;
   applying a compressive load to the stack in the stacking direction so as to place crests and troughs of the corrugated fin structures into contact with adjacent ones of the side sheets and with adjacent ones of the broad and flat sides of the tubes;
   creating braze joints at points of contact between the corrugated fin structures and the side sheets, and at points of contact between the corrugated fin structures and the tubes; and
   removing the brazed heat exchanger tube assemblies from the separator sheets.

8. The method of claim 7, wherein creating braze joints includes elevating the temperature of the stack in a vacuum environment.

9. The method of claim 7, wherein creating braze joints includes elevating the temperature of the stack in a controlled inert gas atmosphere environment.

10. The method of claim 7, wherein at least one of providing a plurality of tubes, providing a plurality of corrugated fin structures, and providing a plurality of side sheets includes providing a material coated with a braze filler metal.

11. The method of claim 7, wherein the separator sheets have a coefficient of thermal expansion that is generally matched to the coefficients of thermal expansion of the tubes the corrugated fin structures, and the side sheets.

12. The method of claim 9, wherein the separator sheets have a coating to prevent the metallurgical bonding between said separator sheets and the side sheets.

13. The method of claim 1, wherein a first bar is placed adjacent the first plurality of separator sheets and a second bar is placed adjacent the second plurality of separator sheets and wherein the applying the compressive force includes transmitting the compressive force through the first bar and through the second bar.

14. The method of claim 13, further including maintaining the compressive force after applying the compressive force by tightening at least one band across the first bar, the tube, and the second bar.

15. The method of claim 1, wherein at least a first gap is located within the first plurality of separator sheets and at least a second gap is located within the second plurality of separator sheets.

16. A method of making a heat exchanger tube assembly, comprising:
   providing a tube having first and second opposing broad and flat sides;
   providing first and second corrugated fin structures;
   providing first and second side sheets;
   arranging the first corrugated fin structure between the first side sheet and the first broad and flat side of the tube;
   arranging the second corrugated fin structure between the second side sheet and the second broad and flat side of the tube;
   applying a compressive force to opposing sides of the first and second side sheets to place crests and troughs of the first corrugated fin structure into contact with the first side sheet and the first broad and flat side of the tube, and to place crests and troughs of the second corrugated fin structure into contact with the second side sheet and the second broad and flat side of the tube; and
   creating braze joints between the first corrugated fin structure and the first side sheet, the first corrugated fin structure and the first broad and flat side of the tube, the second corrugated fin structure and the second side sheet, and the second corrugated fin structure and the second broad and flat side of the tube,
   wherein applying the compressive force includes transmitting the compressive force through a first separator sheet arranged adjacent the first side sheet, and through a second separator sheet arranged adjacent the second side sheet, such that the first side sheet is located between the first separator sheet and the first corrugated fin structure, and the second side sheet is located between the second separator sheet and the second corrugated fin structure, and
   wherein the first and second separator sheets have a coefficient of thermal expansion that is generally matched to the coefficients of thermal expansion of the tube, the first and second corrugated fin structures, and the first and second side sheets.

17. The method of claim 16, wherein a first bar is placed adjacent the first separator sheet and a second bar is placed adjacent the second separator sheet, and wherein the applying the compressive force includes transmitting the compressive force through the first bar and through the second bar.

18. The method of claim 16, wherein the first and second separator sheets have a coating to prevent the metallurgical bonding between the separator sheets and the side sheets.

19. The method of claim 16, further including maintaining the compressive force after applying the compressive force by tightening at least one band across the first bar, the tube, and the second bar.

20. The method of claim 16, further including arranging a third separator sheet adjacent to the first separator sheet and arranging a forth separator sheet adjacent to the second separator sheet, wherein a first gap is located between the first separator sheet and the third separator sheet and a second gap is located between the second separator sheet and the forth separator sheet.

* * * * *